Patented Aug. 24, 1943

2,327,705

UNITED STATES PATENT OFFICE 2,327,705

LUBRICANT

Per K. Frolich, Westfield, and Henry B. Kellog, Union City, N. J., assignors to Standard Oil Development Company, a corporation of Delaware No Drawing. Application July 6, 1940,
Serial No. 344,218

9 Claims. (Cl. 252—59)

This invention relates to improved lubricants; it relates particularly to new and useful viscosity, and viscosity index improving substances, and relates especially to oil-soluble interpolymers of ethylene, with one or more other polymerizable compounds containing one or more double bonds, for improving the characteristics of hydrocarbon oils.

Most of the olefinic substances can be polymerized into relatively high molecular weight substances, e. g. over 2000 molecular weight, by various polymerization processes, and some of these polymers, especially the low temperature polymers of isobutylene have been found to be soluble in hydrocarbon oils generally and to be very useful for improving the viscosity and viscosity index of lubricants. However, the similarly high molecular weight polymer of the simplest olefin, that is, polyethylene, has been found to be insoluble in hydrocarbon oils, or of such low solubility as to be without utility for improving the viscosity characteristics of lubricants.

Ethylene can readily be polymerized to yield polymers ranging from low molecular weight relatively light fluid or oily polymers, up to viscous oils or even solids by polymerization of the ethylene at elevated temperatures ranging from about 200° to 400° C., and elevated pressures ranging from about 200 atmospheres to about 3000 atmospheres; either with or without the aid of polymerization catalysts. The solid high molecular weight polymers have many valuable and useful features, but they are substantially insoluble at room temperature in such organic solvents as benzene, toluene, xylene, petroleum ether, lubricating oils and hydrocarbon solvents in general.

One object of the present invention is to make lubricant blends containing a modified polymerization product of ethylene which is soluble in lubricating oils. Another object, which results more or less from the first one, is to make use of ethylene which is available in much more abundant supply and at lower cost than the higher olefins, for preparing lubricating oil addition agents. A still further object is to make lubricants which have superior viscosity index relationship than have been made heretofore with any particular percentage of addition agents. These and other objects and advantages of the invention will be better understood from the following specification.

It has now been found that interpolymers of ethylene are oil-soluble and when in solution in the lubricant, markedly improve the viscosity, and viscosity index of the lubricating oil. In preparing such interpolymers, mixtures of ethylene and another olefin or other unsaturated material are prepared and polymerized under conditions of very high pressure in the presence of an appropriate catalyst and the polymerization reaction preferably conducted to yield a polymer which may be considered essentially an ethylene polymer modified by the interpolymerization therein of varying amounts of the other olefin or diolefin, to produce an interpolymer which is sufficiently soluble in hydrocarbons generally, and in lubricants especially, to produce a new and useful lubricant having particularly valuable characteristics of viscosity, and viscosity index.

According to the present invention there is introduced into the ethylene to be polymerized, preferably with a small amount of oxygen as catalyst, a certain amount of other olefins such as propylene, normal butylenes, isobutylene, amylenes including pentene-2, isoamylene, and methyl ethyl ethylene, hexylenes, heptenes, octenes, etc. and their homologues; or diolefins such as butadiene, isoprene, pentadiene, dimethyl butadiene, dimethyl pentadiene, 2,3 dichlorbutadiene, chloroprene, 1,3-pentadiene, 2-methyl-1,3-butadiene, 1,3-hexadiene, 3-methyl-2,4-pentadiene, 2-normal butyl-1,3-butadiene (butoprene), 2-tertiary butyl-1,3-butadiene, 2-normal heptyl butadiene (heptoprene) and their homologues, or acetylenic substances including acetylene per se, divinyl acetylene, etc., or even unsaturated hydrocarbon derivatives such as acrylic acid or an acrylate. Also various cyclic polymerizable unsaturated compounds can be used such as aromatic olefins, e. g. styrene, indene, and the like, or cyclic olefins, e. g. cyclohexene, or cyclic diolefins e. g. cyclopentadiene. Furthermore, instead of using just one of these various auxiliary polymerizable materials, mixtures of two or more of them can be used in carrying out the interpolymerization with ethylene. The addition of any one of these substances produces an interpolymer of ethylene and the other unsaturated constituent which is considerably different in physical and chemical characteristics from the simple ethylene polymers, the most important change being the modification of its solubility characteristics to make the polymer soluble in hydrocarbon solvents generally, thereby making available its valuable and important capacities of improving the viscosity, viscosity index and usefulness of lubricant materials.

In carrying out the interpolymerization, these mixtures may be prepared at ordinary temperatures and pressures, and preferably contain as catalyst a small amount, ranging from 0.001% to 2 or 3% of oxygen, or oxygen-yielding compounds such as peroxides, both inorganic or organic, especially benzoyl peroxide which is the preferable peroxide catalyst. This mixture is then compressed to pressures ranging from 200 or 500 atmospheres to 3000 atmospheres or higher and heated at temperatures ranging from about 100° C. or preferably 200° C. to 400° C. or above. The polymerization occurs after standing for varying intervals of time ranging from a few minutes to a considerable number of hours.

The resulting interpolymers of ethylene and other olefins are high molecular weight substantially saturated linear chain compounds in which the unsaturation characteristic of the olefin molecule almost entirely disappears, and it is believed that all of the carbon to carbon bonds in the linear chain are single, saturated bonds, except the terminal bond at one end of the chain which is believed to be unsaturated. The presence of the other olefins introduces a certain amount of branchiness, depending upon the character of the other olefin, and the proportion of the other olefin present. The use of diolefinic and acetylenic compounds also tends to increase the unsaturation of the polymeric material. The small amount of branchiness introduced even with from 1 to 3% of an auxiliary olefin such as isobutylene, is sufficient to modify profoundly the solubility relationships with the hydrocarbons in question, e. g. lubricating oil fractions from petroleum. In general, however, we prefer to use a higher percentage, e. g. 5 to 80% or so, preferably 10 to 60%, of such auxiliary olefin in order to obtain a product possessing satisfactory solubility in highly paraffinic oils. The distinction between prior polymers of ethylene and the polymer of the present invention may be expressed by the following formulae where formula 1 is polyethylene, e. g.

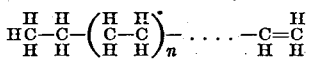

where $n$ is an integer high enough to give the polymer a molecular weight of at least 2000. In contrast to this simple structure, the new polymers of the present invention contain a substantial number of branched groups as in formulae:

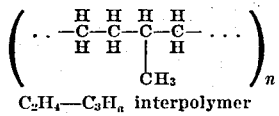

$C_2H_4$—$C_3H_6$ interpolymer or

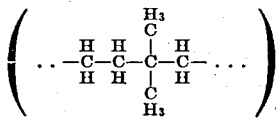

$C_2H_4$—$iC_4H_8$ interpolymer

Example 1

A mixture is prepared consisting of 200 parts by weight of ethylene, 300 parts by weight of isobutylene and 7.5 parts by weight of benzoyl peroxide (equivalent to about 0.5 part by weight of available oxygen) and compressed to a reaction pressure of 1500 atmospheres at a temperature of 215° C. in a steel bomb. The mixture is maintained at approximately this temperature and pressure for a period of approximately 15 hours. At the end of this interval a reaction product consisting of a mixture of a soft solid and a liquid polymer of terpene-like character is formed. These substances are separated by distilling off the liquid portion under vacuum. The residual solid is a waxy substance having a molecular weight above 2000.

In preparing the lubricant according to this invention, a portion of 1000 cc. of 20-W motor oil (S. A. E. 20-W grade) is introduced into a container and warmed to approximately 160° F. 20 grams of the waxy polymer separated as above described is then gradually added to the mixture and agitated until a homogeneous solution or blend is obtained. The resulting solution is a very valuable lubricant having a substantial increase in viscosity and viscosity index in comparison to the original oil.

Example 2

A mixture of 400 parts by weight of ethylene and 100 parts by weight of pentene-2 is prepared as in Example 1, together with 1 part by weight of gaseous oxygen. This mixture is then compressed to a pressure of 2500 atmospheres in a steel bomb and held at a temperature of 250° C. for a time interval of three hours. At the close of this time interval the bomb reactor is opened and found to contain a reaction product in the form of a hard, waxy substance resembling paraffin wax having a molecular weight range above 2000. This substance is an interpolymer of the ethylene and pentene-2.

40 parts by weight of this interpolymer are dissolved in 1000 parts by weight of 20-W oil as in Example 1, and produced a lubricant having a substantial increase in viscosity and viscosity index.

Example 3

A mixture of 400 parts by weight of ethylene and 100 parts by weight of propylene is prepared and compressed to a pressure of approximately 2500 atmospheres at a temperature of approximately 250° C. and allowed to react for a time interval of approximately three hours as in Example 2, 1 part of oxygen also being present in the polymerization mixture. A similar polymer of similar molecular weight is obtained.

This polymer is added to 20-W motor oil as in Examples 1 and 2 and the resulting lubricant showed a substantial increase in the viscosity index.

Instead of preparing mixtures of the reactants in the above example, a dry gas mixture of 37% propylene and 15% ethylene, which is obtained from coke oven gas either by low temperature condensation or by absorption by active carbon during the subsequent operation and driving off, can be just as effectively utilized to give a thick viscous oil possessing viscosity improving properties.

Example 4

A mixture is prepared consisting of 2000 parts by weight of ethylene, 100 parts by weight of dimethylbutadiene and approximately 2 parts by weight of oxygen and compressed into a steel bomb reactor at a pressure of 2500 atmospheres and held at a temperature of approximately 230° C. for a time interval between 3 and 4 hours. At the close of this reaction time the bomb is opened and it will be found to contain a soft, rubber-like solid polymer. This polymer likewise has a high molecular weight.

20 parts by weight of this polymer are dissolved in 1000 parts by weight of 20-W motor oil and the resulting oil is found to have an increased viscosity index.

Example 5

A mixture is prepared consisting of 800 parts by weight of ethylene, 200 parts by weight of limonene (Δ1,8(9)-p-menthadiene) together with 0.5 part of oxygen and compressed into a steel reaction bomb at a pressure of 2500 atmospheres. The bomb and contents are maintained at a temperature of approximately 250° C. for a time interval of 20 hours. At the end of this time the bomb is opened and found to contain a waxy polymer which likewise is soluble in a lubricating oil to effect a substantial increase in viscosity, and viscosity index.

Example 6

100 parts by weight of the dodecyl ester of fumaric acid is placed into a thick walled steel reaction bomb and ethylene containing 0.6% of oxygen is then compressed into the bomb to give a reaction pressure of 1500 atmospheres. The reaction bomb is maintained at a temperature of approximately 210° C. for a time interval of approximately 20 hours and is mechanically stirred during this interval. At the end of the stated time interval, the bomb is opened and it will be found to contain a reaction product markedly greater in volume than the volume of the ester originally placed in the reactor, and approximate analysis indicates that the product contains an interpolymer made up of approximately 60% ethylene molecules and 40% molecules of the dodecyl ester of fumaric acid. This material likewise is soluble in hydrocarbons and will effect a pronounced improvement in the viscosity, and viscosity index.

Example 7

A quantity consisting of 100 parts by weight of dodecyl methacrylate monomer is placed in a steel reaction bomb and 800 parts by weight of ethylene containing 0.04% by weight of oxygen and then compressed into the bomb until a pressure of 2500 atmospheres is reached. The bomb is then heated to a temperature of approximately 200° C. and maintained for a time interval of approximately 20 hours during which time the bomb is mechanically stirred. At the close of this time interval, the bomb is opened and it will be found to contain a hard, pliable solid which also has commercially important physical and chemical properties including solubility in hydrocarbons and the capability of raising the viscosity, and viscosity index of lubricant compositions.

Example 8

An interploymer similar to that in Example 7 is prepared, utilizing only 50 parts by weight of the dodecyl methacrylate monomer to approximately 800 parts by weight of ethylene with similar proportion of oxygen and similar temperature, pressure and time produces a similar interpolymer which is a rubbery solid. This material likewise markedly improves the characteristics of a lubricating oil.

All of the products in the above set forth examples are used in lubricating oils in relatively low concentrations, in the neighborhood of 2% and 4%, but even smaller amounts, e. g. 1% or less may be used if desired. Higher proportions of these substances ranging from 4% to 10% or higher are likewise soluble, or at least compatible with the hydrocarbon lubricating oil and may be used to advantage under some circumstances. These interpolymers show the unexpected and valuable property of imparting to the lubricant a marked "stringiness" which is of particularly great value, especially in lubricating greases. This stringiness is of particular value in heavy duty lubricants where the stringiness tends to hold the lubricant between pressure surfaces more effectively than is possible with lubricants of lower stringiness.

The polymers have the characteristics of saturated or paraffinic compounds generally being very resistant to oxidation. However, they may be halogenated, e. g. chlorinated by the direct treatment with chlorine in solvents such as carbon tetrachloride, especially under conditions of elevated temperature and pressure, and the resulting chlorinated ethylene interpolymers are soluble in lubricating oils and make valuable addition agents for lubricants. Furthermore, the molecular weight is high enough, without chlorination or even after such treatment, to be highly efficient and effective in increasing the viscosity index, but the polymers are of such character as to be highly resistant to mechanical breakdown from friction or pressure or heat forces. Interpolymers with more highly unsaturated compounds, such as the diolefins, have higher degrees of unsaturation than do the other interpolymers produced from the simple olefins. These materials are generally somewhat less resistant to chemical influences but, generally not seriously enough so as to interfere with their use in lubricants.

These more highly unsaturated polymers may be reduced by hydrogenation, preferably in solution in saturated aliphatic hydrocarbons, preferably by treatment with a hydrogenation catalyst at elevated temperature and pressure to produce either fully saturated aliphatic interpolymers or substantially saturated aliphatic interpolymers. These more unsaturated interpolymers likewise may be chlorinated and the unsaturated bonds in the polymer molecule are saturated first by the chlorine. This reaction proceeds at temperatures and pressures not far from atmospheric pressure and room temperature. Further treatment with chlorine will chlorinate them to higher percentages of chlorine content by the replacement of hydrogen by chlorine. Such chlorinated polymers, either chlorinated merely to the extent of saturation or chlorinated beyond this point are soluble in hydrocarbon lubricants and are particularly resistant to mechanical disintegration or breakdown, to oxidation under prolonged use and, in addition, the presence of the chlorine imparts extreme pressure characteristics to the lubricant.

The invention is not, however, limited to the improvement of lubricating oils, but the interpolymers are useful for viscosity index improvement generally, especially for such uses as gasoline and Diesel fuels, and the hydrocarbon oil base may be a synthetic hydrocarbon or may be a natural hydrocarbon of any type such as a paraffinic lubricating oil of the Pennsylvania type or a naphthenic lubricating oil of the Coastal type or a lubricating oil stock obtained from a mixed crude, or a fraction of any type of natural hydrocarbon such as various fractions obtained by distillation, solvent extraction, etc. with or without various refining or treating steps for purification such as acid treating, clay treating, etc. Because of their high inertness to chemicals generally, these polymers may be added to substantially any of the compounded lubricants and produce a substantial improvement in their characteristics.

The above presented examples utilize relatively high pressures up to 2500 atmospheres. It is found, however, that still higher pressures are particularly advantageous in the polymerization procedure, since lower temperatures may be used, than are necessary at the pressures above indicated, and also certain advantages with regard to the catalyst concentration are obtainable. Also more uniform polymers are obtainable at these higher pressures, and in addition a wider range of auxiliary or interpolymerized olefines are obtained. For this purpose pressures ranging from 3000 atmospheres to 20,000 atmospheres or even higher which are obtained by means of a hydraulic intensifier attached to the hydraulic pump of the high pressure apparatus, are desirable and by the use of such pressures, higher molecular weight interpolymers in the form of rubber-like solids are more easily prepared. Also these polymerization reactions may be conducted in emulsion, solution or by mixing the reactants at pressures ranging from 3000 to 15,000 atmospheres and higher either at room temperature or at elevated temperatures to give rubber-like materials.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. A lubricating oil composition comprising a petroleum lubricating oil containing in solution an interpolymer having a molecular weight above 2000 formed by the copolymerization of ethylene and another olefine at a pressure of at least 500 atmospheres and a temperature of 100° C. to 400° C., the interpolymer being added in sufficient amount to modify the viscosity index properties of the oil.

2. A lubricant according to claim 1 in which the other olefin is an aliphatic olefin having less than 10 carbon atoms.

3. Lubricant according to claim 1 in which the interpolymer is composed of about 40% to 90% of ethylene and about 10% to 60% of the other olefin.

4. A lubricating oil composition comprising a petroleum lubricating oil containing in solution an interpolymer having a molecular weight above 2000 formed by the copolymerization of ethylene and isobutylene at a pressure of at least 1500 atmospheres and a temperature of 200° C. to 250° C., the interpolymer being added in sufficient amount to modify the viscosity index properties of the oil.

5. A lubricating oil composition comprising a petroleum lubricating oil containing in solution an interpolymer having a molecular weight above 2000 formed by the copolymerization of ethylene and a diolefine at a pressure of at least 500 atmospheres and a temperature of 100° C. to 400° C., the interpolymer being added in sufficient amount to modify the viscosity index properties of the oil.

6. A lubricating oil composition comprising a lubricating oil base stock containing in solution a minor proportion of an interpolymer of ethylene and a diolefine prepared by a polymerization reaction conducted at a pressure between 1500 atmospheres and 3000 atmospheres at a temperature between 100° C. and 500° C., the interpolymer being added in sufficient amount to modify the viscosity index properties of the oil.

7. A composition comprising a hydrocarbon base stock containing in solution an interpolymer prepared by copolymerizing ethylene and another polymerizable, essentially hydrocarbon compound containing at least one double bond at a pressure of at least 500 atmospheres and a temperature of 100° C. to 400° C., the interpolymer being added in sufficient amount to modify the viscosity index properties of the oil.

8. A lubricating composition comprising a lubricating oil base stock containing in solution an interpolymer prepared by copolymerizing ethylene and another polymerizable, essentially hydrocarbon compound containing at least one double bond at a pressure of at least 500 atmospheres and a temperature of 200° C. to 250° C., the interpolymer being added in sufficient amount to modify the viscosity index properties of the oil.

9. A lubricating composition comprising a lubricating oil base stock containing in solution a minor proportion of an interpolymer prepared by copolymerizing ethylene and another polymerizable, essentially hydrocarbon compound containing at least one double bond at a pressure of at least 1500 atmospheres and a temperature of 200° C. to 250° C., the interpolymer being added in sufficient amount to modify the viscosity index properties of the oil.

PER K. FROLICH.
HENRY B. KELLOG.